(12) United States Patent
Zhao et al.

(10) Patent No.: US 12,015,493 B2
(45) Date of Patent: *Jun. 18, 2024

(54) METHOD FOR TRANSMITTING FEEDBACK INFORMATION, AND TERMINAL DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Huei-Ming Lin, South Yarra (AU); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/586,233

(22) Filed: Jan. 27, 2022

(65) Prior Publication Data

US 2022/0150001 A1 May 12, 2022

Related U.S. Application Data

(63) Continuation of application No. 17/216,604, filed on Mar. 29, 2021, now Pat. No. 11,303,398, which is a
(Continued)

(51) Int. Cl.
*H04L 1/1867* (2023.01)
*H04W 72/23* (2023.01)
(Continued)

(52) U.S. Cl.
CPC ........... *H04L 1/1896* (2013.01); *H04W 72/23* (2023.01); *H04W 76/11* (2018.02); *H04W 76/27* (2018.02); *H04W 92/18* (2013.01)

(58) Field of Classification Search
CPC ... H04L 1/1896; H04L 1/1685; H04L 1/1854; H04L 5/0055; H04L 1/0026;
(Continued)

(56) References Cited

U.S. PATENT DOCUMENTS

2017/0215183 A1* 7/2017 Gulati ................... H04L 1/1896
2019/0052436 A1* 2/2019 Desai .................... H04L 5/0055
(Continued)

FOREIGN PATENT DOCUMENTS

| CN | 108322414 A | 7/2018 |
| CN | 108347307 A | 7/2018 |

(Continued)

OTHER PUBLICATIONS

WO, International Search Report, PCT/CN2018/109725, dated Jul. 2, 2019, 30 pages.
(Continued)

*Primary Examiner* — Kyaw Z Soe
(74) *Attorney, Agent, or Firm* — BAYES PLLC

(57) ABSTRACT

A method for transmitting feedback information includes obtaining, by a first terminal, first indication information, wherein the first indication information is used for indicating whether the first terminal needs to send feedback information; receiving, by the first terminal, a first sidelink channel sent by a second terminal; and determining, by the first terminal, whether to send the feedback information for the first sidelink channel to the second terminal according to the first indication information.

17 Claims, 3 Drawing Sheets

Related U.S. Application Data continuation of application No. PCT/CN2018/109725, filed on Oct. 10, 2018.

(51) Int. Cl.
*H04W 76/11* (2018.01)
*H04W 76/27* (2018.01)
*H04W 92/18* (2009.01)

(58) Field of Classification Search
CPC ..... H04L 5/0057; H04W 72/23; H04W 76/11; H04W 76/27; H04W 92/18; H04B 7/0626
See application file for complete search history.

(56) References Cited

U.S. PATENT DOCUMENTS

| | | | |
|---|---|---|---|
| 2019/0140804 A1 | 5/2019 | Tang | |
| 2019/0349895 A1* | 11/2019 | Liu | H04L 5/0094 |
| 2019/0364590 A1* | 11/2019 | Sartori | H04W 72/23 |
| 2020/0099476 A1* | 3/2020 | Park | H04W 4/70 |

FOREIGN PATENT DOCUMENTS

| | | | |
|---|---|---|---|
| CN | 108347313 A | 7/2018 | |
| CN | 108631968 A | 10/2018 | |
| CN | 110381599 A | 10/2019 | |
| EP | 3 780 844 A1 | 2/2021 | |
| JP | 2018512009 A | 4/2018 | |
| JP | 2020509671 A | 3/2020 | |
| WO | 2016163509 A1 | 10/2016 | |
| WO | 2018014162 A1 | 1/2018 | |
| WO | 2018137129 A1 | 8/2018 | |
| WO | 2018137452 A1 | 8/2018 | |
| WO | 2018145296 A1 | 8/2018 | |
| WO | 2019029652 A1 | 2/2019 | |

OTHER PUBLICATIONS

PCT Written Opinion of the International Searching Authority issued in corresponding International Application No. PCT/CN2018/109725, dated Jul. 2, 2019, 9 pages.
"Discussion on support of unicast, groupcast and broadcast", Agenda Item: 7.2.4.1.1, Source: MediaTek Inc., 3GPP TSG RAN WG1 Meeting #94bis, R1-1810452, Chengdu, China, Oct. 8-12, 2018, 3 pages.
"Support of unicast, groupcast and broadcast in NR sidelink", Agenda Item: 7.2.4.1.1, Source: CATT, 3GPP TSG RAN1 Meeting #94bis, R1-1810539, Chengdu, China, Oct. 8-12, 2018, 9 pages.
"Support of Sidelink Unicast, Groupcast, and Broadcast Modes for Nr V2X Communication", Agenda item: 7.2.4.1.1, Source: Intel Corporation, 3GPP TSG RAN WG1 Meeting #94bis, R1-1810772, Chengdu, China, Oct. 8-12, 2018, 13 pages.
"Procedures and use cases for groupcast and unicast transmissions", Agenda item: 7.2.4.1.1, Source: Qualcomm Incorporated, 3GPP TSG RAN WG1 Meeting #94bis, R1-1811260, Chengdu, China, Oct. 8-12, 2018, 4 pages.
"Support of Unicast, Groupcast and Broadcast on the NR Sidelink", Agenda Item: 7.2.4.1.1, Source: Ericsson, 3GPP TSG RAN WG 1 Meeting #94-Bis, Tdoc R1-1811591, Chengdu, China , Oct. 2018, 9 pages.
Extended European Search Report issued in corresponding European Application No. 18936619.8, dated Aug. 19, 2021, 11 pages.
"Feedback information for sidelink link adaptation", Agenda Item: 5.2.9.2.3.4, Source: Huawei, HiSilicon, 3GPP TSG RAN WGI Meeting #90, R1-1712136, Prague, Czech Republic, Aug. 21-25, 2017, 2 pages.
Communication pursuant to Article 94(3) EPC issued in corresponding European Application No. 18936619.8, dated Apr. 29, 2022, 8 pages.
First Office action issued in corresponding India Application No. 202127013127, dated Feb. 4, 2022, 6 pages.
First Office Action issued in corresponding Chinese application No. 202110426871.X, dated Aug. 15, 2022.
First Office Action issued in corresponding Japanese application No. 2021-519767, dated Oct. 4, 2022.
Notice of Allowance issued in corresponding Chinese application No. 202110426871.X, dated Nov. 15, 2022.
Second Office Action issued in corresponding European application No. 18936619.8, dated Dec. 6, 2022.
First Office Action issued in corresponding Korean application No. 10-2021-7011378, dated Jan. 16, 2023.
Second Office Action issued in corresponding Korean application No. 10-2021-7011378, dated Jul. 28, 2023.
Notification concerning the date of oral proceedings issued in corresponding European application No. 18936619.8, mailed Aug. 24, 2023.
Decision of Rejection issued in corresponding Japanese application No. 2021-519767, dated Apr. 28, 2023.
Summons to attend Oral Proceedings issued in corresponding European application No. 18936619.8, mailed Jun. 6, 2023.
LG Electronics, "HARQ operation for NR unlicensed operation", R1-1806647, 3GPP TSG RAN WG1 Meeting #93 Busan, Korea, May 21-25, 2018.
Reconsideration Examination Report issued in corresponding Japanese application No. 2021-519767, mailed Oct. 24, 2023.
Notice of Termination of Reconsideration by Examiners before Appeal Proceedings issued in corresponding Japanese application No. 2021-519767, mailed Oct. 24, 2023.
Cancellation of Oral Proceedings issued in corresponding European application No. 18936619.8, mailed Oct. 26, 2023.
Notice of Allowance issued in corresponding European application No. 18936619.8, mailed Nov. 14, 2023.
Second Office Action issued in corresponding Japanese application No. 2021-519767, mailed Jan. 26, 2024.
Source: ASUSTek; Title: Discussion on supporting HARQ combining 3GPP TSG RAN WG1 Meeting #94bis R1-1811163 Chengdu, China, Oct. 8-12, 2018.
Source: MediaTek Inc.; Title: Physical layer structure for NR sidelink 3GPP TSG RAN WG1 Meeting #94bis R1-1810453 Chengdu, China, Oct. 8-12, 2018.
Notice of Final Rejection issued in corresponding Korean Application No. 10-2021-7011378, mailed on Feb. 26, 2024, 6 pages.
Examination Report No. 1 for stantard patent application No. 2018445049, mailed on Mar. 28, 2024, 3 pages.

* cited by examiner

METHOD FOR TRANSMITTING FEEDBACK INFORMATION, AND TERMINAL DEVICE

CROSS-REFERENCE TO RELATED APPLICATIONS

The present application is a continuation application of U.S. application Ser. No. 17/216,604, filed on Mar. 29, 2021, which is a continuation application of International Application No. PCT/CN2018/109725, filed on Oct. 10, 2018, the entire contents of which are incorporated herein by reference.

BACKGROUND

Embodiments of the present disclosure relate to the field of communication, and more particularly, to a method and a terminal device for transmitting feedback information.

An Internet of Vehicles system is a sidelink (SL) transmission technology based on long term evaluation vehicle to vehicle (LTE V2V). The Internet of Vehicles system adopts a device to device direct communication mode, which is different from a mode in which communication data is received or transmitted through a base station in a traditional LTE system, so it has higher spectrum efficiency and lower transmission delay.

In a New Radio (NR)-based Vehicle to Everything (V2X) system, it is required to support automatic driving, which puts forward higher requirements for data interaction between vehicles, such as higher reliability requirements. In order to support high reliability requirements, after a receiving end receives data, it needs to send feedback information to a sending end to assist the sending end in data transmission. The feedback information can be an acknowledgement (ACK) or a negative acknowledgement (NACK), channel state information (CSI) or beam information, etc.

In the NR-V2X system, multiple transmission methods can be supported, such as unicast, groupcast or multicast, broadcast, etc. In multicast communication, a group can include a group header and at least one group member. When the group header sends multicast data to the group member, the group member can send the feedback information to the group header to indicate whether the data is received correctly. However, if all group members send the feedback information to the group header, feedback overhead is relatively high. Therefore, how to reduce the feedback overhead is an urgent problem to be solved.

SUMMARY

A first aspect provides a method for transmitting feedback information, including: obtaining, by a first terminal, first indication information, wherein the first indication information is used for indicating whether the first terminal needs to send feedback information; receiving, by the first terminal, a first sidelink channel sent by a second terminal; and determining, by the first terminal, whether to send feedback information for the first sidelink channel to the second terminal according to the first indication information.

A second aspect provides a method for transmitting feedback information, including: sending, by a second terminal, first indication information to a first terminal, wherein the first indication information is used for indicating whether the first terminal needs to send feedback information; and sending, by the second terminal, a first sidelink channel to the first terminal.

A third aspect provides a terminal device, configured to perform the method in the first aspect or any of the possible implementations thereof. Specifically, the terminal device includes a unit configured to perform the method in the first aspect or any of the possible implementations thereof.

A fourth aspect provides a terminal device, configured to perform the method in the second aspect or any of the possible implementations thereof. Specifically, the terminal device includes a unit configured to perform the method in the second aspect or any of the possible implementations thereof.

A fifth aspect provides a terminal device, including a processor and a memory. The memory is configured to store a computer program, and the processor is configured to call and run the computer program stored in the memory to execute the method in the first aspect or any of the implementations thereof.

A sixth aspect provides a terminal device, including a processor and a memory. The memory is configured to store a computer program, and the processor is configured to call and run the computer program stored in the memory to execute the method in the second aspect or any of the implementations thereof.

A seventh aspect provides a chip, configured to perform the method in any one of the first to second aspects or any of the implementations thereof.

Specifically, the chip includes: a processor, configured to call and run a computer program from a memory, so that a device installed with the chip performs the method in any one of the first to second aspects or any of the implementations thereof.

An eighth aspect provides a computer-readable storage medium, configured to store a computer program that causes a computer to perform the method in any one of the first to second aspects or any of the implementations thereof.

A ninth aspect, there provides a computer program product, including computer program instructions, which cause the computer to perform the method in any one of the first to second aspects or any of the implementations thereof.

A tenth aspect provides a computer program which, when running on a computer, causes the computer to perform the method in any one of the first to second aspects or any of the implementations thereof.

DETAILED DESCRIPTION

The technical solutions in the embodiments of the present disclosure will be described below with reference to the accompanying drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts shall fall within the protection scope of the present disclosure.

It should be understood that the technical solutions of the embodiments of the present disclosure may be applied to a device to device (D2D) communication system, for example, an Internet of Vehicles system that performs D2D communication based on long term evolution (LTE). Unlike a traditional LTE system in which communication data between terminals is received or sent through a network device (for example, a base station), the Internet of Vehicles system uses a device to device direct communication mode, so it has higher spectrum efficiency and lower transmission delay.

Optionally, the communication system which is based on by the Internet of Vehicles system may be a Global System for Mobile communications (GSM) system, a Code Division Multiple Access (CDMA) system, a Wideband Code Division Multiple Access (WCDMA) system, a General Packet Radio Service (GPRS), an LTE system, an LTE Frequency Division Duplex (FDD) system, an LTE Time Division Duplex (TDD), a Universal Mobile Telecommunication System (UMTS), a Worldwide Interoperability for Microwave Access (WiMAX) communication system, a 5G new radio (NR) system, or the like.

The terminal device in the embodiments of the present disclosure may be a terminal device that can implement D2D communication. For example, it may be a vehicle terminal device, a terminal device in a 5G network, or a terminal device in a future evolved public land mobile network (PLMN), etc., which is not limited in the embodiment of the present disclosure.

Figures 1, 2, 3:
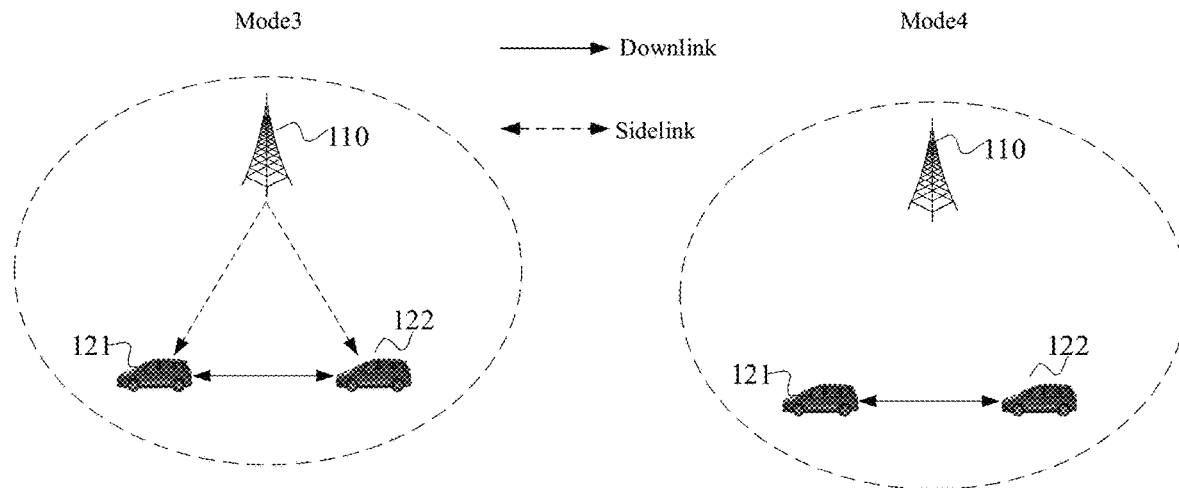
FIG. 1 is a schematic diagram of a communication system architecture provided by an embodiment of the present disclosure.
FIG. 2 is a schematic diagram of a method for transmitting feedback information provided by an embodiment of the present disclosure.
FIG. 3 is a schematic diagram of a method for transmitting feedback information provided by an embodiment of the present disclosure.

FIG. 1 is a schematic diagram of an application scenario of an embodiment of the present disclosure. FIG. 1 exemplarily shows one network device 110 and two terminal devices 121 and 122. Optionally, the wireless communication system in the embodiments of the present disclosure may include a plurality of network devices, and a coverage range of each network device may include other numbers of terminal devices, which is not limited by the embodiment of the present disclosure.

Optionally, the wireless communication system may also include other network entities such as a mobile management entity (MME), a serving gateway (S-GW), and a packet data network gateway (P-GW). Alternatively, the wireless communication system may also include other network entities such as a session management function (SMF), unified data management (UDM), and an authentication server function (AUSF), which is not limited by the embodiment of the present disclosure.

In the Internet of Vehicles system, the terminal device can use mode 3 and mode 4 for communication.

Specifically, a terminal device 121 and a terminal device 122 may communicate in a D2D communication mode. When performing the D2D communication, the terminal device 121 and the terminal device 122 directly communicate through a D2D link, that is, a sidelink SL. In the mode 3, transmission resources of the terminal device are allocated by the base station, and the terminal device can send the data on the SL according to the resources allocated by the base station. The base station can allocate a single transmission resource for the terminal device or can allocate a semi-static transmission resource for the terminal. In the mode 4, the terminal device adopts a sensing plus reservation transmission mode, and the terminal device independently selects transmission resources from SL resources. Specifically, the terminal device obtains a set of available transmission resources in a resource pool by means of sensing, and the terminal device randomly selects a resource from the set of available transmission resources for data transmission.

In the Internet of Vehicles system, other transmission modes can also be defined. For example, mode 1 indicates that sidelink transmission resources of the terminal device are allocated by the base station, and mode 2 indicates that the terminal device independently selects the sidelink transmission resources, which is not limited by the embodiments of the present disclosure.

A D2D communication can refer to a vehicle to vehicle (V2V) communication or vehicle to everything (V2X) communication. In the V2X communication, X can generally refer to any device with wireless receiving and sending capabilities, for example but not limited to a slow-moving wireless device, a fast-moving vehicle-mounted device, or a network control node with wireless sending and receiving capabilities. It should be understood that the embodiments of the present disclosure are mainly applied to a V2X communication scenario but can also be applied to any other D2D communication scenario, which is not limited in the embodiments of the present disclosure.

FIG. 2 is a schematic flowchart of a method for transmitting feedback information according to an embodiment of the present disclosure. The method may be executed by a terminal device in an Internet of Vehicles system, such as the terminal device 121 or the terminal device 122. As shown in FIG. 2, the method 200 includes S210, obtaining, by a first terminal, first indication information, wherein the first indication information is used for indicating whether the first terminal needs to send feedback information; S220, receiving, by the first terminal, a first sidelink channel sent by a second terminal; and S230, determining, by the first terminal, whether to send the feedback information for the first sidelink channel to the second terminal according to the first indication information.

Specifically, the second terminal may send the first sidelink channel to the first terminal, and the first terminal may determine whether it needs to reply the feedback information to the second terminal according to the first indication information. For example, if the first indication information indicates that the feedback information needs to be sent, the first terminal determines to send the feedback information for the first sidelink channel to the second terminal; or if the first indication information indicates that the feedback information does not need to be sent, the first terminal determines not to send the feedback information for the first sidelink channel to the second terminal.

Optionally, in an embodiment, if the second terminal and the first terminal belong to a same group, the second terminal is a group header of this group, and the first terminal may be a member of this group (referred to as a first case), the first sidelink channel may be sent by the second terminal to the first terminal in a unicast manner or may also be sent to the first terminal in a multicast manner.

Optionally, in another embodiment, the second terminal and the first terminal may belong to a same group, and both the second terminal and the first terminal may be group members in this group (referred to as a second case), then the first sidelink channel may be sent by the second terminal to the first terminal in a unicast manner.

Optionally, in an implementation, the first indication information may be specifically used for indicating that the first terminal needs or does not need to send the feedback information for the first sidelink channel.

Optionally, in another implementation, the first indication information may be specifically used for indicating that there is a need or there is no need to send the feedback information for the first sidelink channel in unicast communication where the first terminal is located. Optionally, in still another implementation, the first indication information may be specifically used for indicating that there is a need or there is no need to send the feedback information for the first sidelink channel in multicast communication where the first terminal is located. Optionally, in some embodiments, the first indication information may further include first identification information, and the first identification information is group identification information, or the first identification information is identification information of the second terminal, or the first identification information is used for indicating link information for unicast communication performed by the first terminal and the second terminal, wherein the group identification information is used for indicating a group where the first terminal and the second terminal are located.

For the first case, the first terminal and the second terminal belong to a first group, the second terminal is a group header of the first group, and the first terminal is a group member in the first group, then the first identification information may be group identification of the first group or the identification information of the second terminal.

For the second case, the first terminal and the second terminal belong to the first group, the first terminal and the second terminal are both group members in the first group, and the first terminal and the second terminal communicate in a unicast manner, the first identification information may be the identification information of the second terminal, or link identification for unicast communication performed by the first terminal and the second terminal.

It should be understood that in the embodiments of the present disclosure, the group header of the group can be considered as a central node or a control node of the group, and the group header has management and control functions. As an example, rather than limitation, the group header may perform operations such as adding or deleting of the group members in the group and can also send multicast data to all group members in the group.

Optionally, in some embodiments, whether the first indication information includes the first identification information may be used for indicating an application scope of the first indication information.

In an embodiment, if the first indication information does not include the first identification information, the first indication information may be applicable to all unicast communications and/or multicast communications where the first terminal is located, that is, the first terminal determines whether it is necessary to send the feedback information for all unicast communications and/or multicast communications related to the first terminal according to the first indication information. For example, if the first indication information indicates that the first terminal needs to send the feedback information, the first terminal needs to send the feedback information for all received unicast data or multicast data; and if the first indication information indicates that the first terminal does not need to send the feedback information, the first terminal does not need to send feedback information for the received unicast data or multicast data.

In an embodiment, if the first indication information includes the first identification information, the first indication information is only applicable to the unicast communication or the multicast communication corresponding to the first identification information.

For example, if the first identification information is the group identification information of the group to which the first terminal and the second terminal belong, the first indication information may be applicable to the unicast communication and/or the multicast communication in the group indicated by the group identification information. Alternatively, if the first identification information is the identification information of the second terminal, the first indication information is applicable to the unicast communication and/or the multicast communication with the second terminal. Alternatively, if the first identification information is the identification information of the unicast communication link for the unicast communication performed by the first terminal and the second terminal, the first indication information is applicable to the unicast communication link indicated by the identification information of the unicast link.

Optionally, as an embodiment, the S210 may specifically include receiving, by the first terminal, a second sidelink channel, wherein the second sidelink channel incudes the first indication information.

Optionally, the second sidelink channel may be a channel used for communication between terminal devices such as a physical sidelink control channel (PSCCH), a physical sidelink shared channel (PSSCH) or a physical sidelink broadcast channel (PSBCH).

In one case, the second terminal and the first terminal belong to the same group, the second terminal can be the group header of the group, and the first terminal is the group member in the group, then the second sidelink channel may be sent by the second terminal.

In another case, a third terminal, the second terminal, and the first terminal belong to a same group, the third terminal may be the group header of the group, and the first terminal and the second terminal are group members in the group, then the second sidelink channel may be sent by the third terminal.

That is, the first indication information may be sent by the group header of the group to which the first terminal and the second terminal belong.

In one case, the first terminal and the second terminal perform unicast communication, the second terminal is a sending end of the first sidelink channel, and the second terminal may send the second sidelink channel.

Optionally, as another embodiment, the S210 may specifically include receiving, by the first terminal, first configuration information sent by a network device, wherein the first configuration information includes the first indication information.

That is, the first indication information may be configured by the network device. Optionally, the first configuration information may be existing configuration information used for configuring the first terminal, for example, configuration information used for activating or deactivating an uplink carrier, which is not limited in the embodiments of the present disclosure.

Optionally, the first configuration information may be carried in a downlink message, downlink information, or a downlink channel such as a broadcast message, radio resource control (RRC) signaling, or downlink control information (DCI), which is not limited in the embodiments of the present disclosure.

Optionally, as yet another embodiment, the first indication information may be obtained from pre-configuration information on the first terminal, and the pre-configuration information is pre-configured on the first terminal.

Optionally, the first indication information may be pre-configured on the first terminal by way of factory settings, or the first indication information may also be agreed by an agreement, so that the information agreed by the agreement may be pre-configured on the first terminal.

In an embodiment of the present disclosure, the first indication information may be indicated by a specific attribute field. When the specific attribute field is in a first state, it is used for indicating that the first terminal needs to send the feedback information. When the specific attribute field is in a second state, it is used for indicating that the first terminal does not need to send the feedback information.

Optionally, the specific attribute field is one or more bits. Taking 1 bit as an example, when the 1-bit indication information is 0, it is used for indicating that the first terminal does not need to send the feedback information. When the 1-bit indication information is 1, it is used for indicating that the first terminal needs to send the feedback information.

Optionally, in an embodiment of the present disclosure, the first sidelink channel may be a sidelink data channel, for example, a physical sidelink shared channel (PSSCH) or other channels used for data transmission between terminal devices.

Optionally, in an embodiment of the present disclosure, the feedback information may be ACK, NACK, CSI or beam information, etc., or the feedback information may be other information that can be used for indicating whether the data is received correctly, for example, a new data indication (NDI).

Optionally, in some cases, if transmission reliability of the first sidelink channel can be guaranteed, for example, if the second terminal sends the first sidelink channel to the first terminal a plurality of times according to a predetermined number of times (e.g., 3 or 4 times), the first indication information can be used for indicating that there is no need to reply the feedback information to the second terminal, which is beneficial to reduce feedback overhead and also ensures the reliability of data transmission.

Optionally, if the second terminal only sends the first sidelink channel once, it can be considered that the transmission reliability of the first sidelink channel cannot be guaranteed. Therefore, the first indication information can be used for indicating that the feedback information needs to be sent to the second terminal, so that the second terminal can determine whether to retransmit data according to the feedback information, which is beneficial to ensure the reliability of data transmission.

In the following, the method for transmitting feedback information according to the embodiments of the present disclosure will be described in conjunction with specific embodiments.

In a first embodiment, the second terminal and the first terminal belong to the same group, the second terminal is the group header of the group, and the first terminal is a group member of the group, which corresponds to the first case described above.

The first terminal receives the first sidelink channel sent by the second terminal, and the first sidelink channel may be sent to the first terminal in the unicast manner or may also be sent to the first terminal and other group members in the group (for example, a fourth terminal) in a multicast manner. In this case, if each group member in the group replies feedback information to the second terminal, the feedback overhead is relatively high.

In the first embodiment, the first terminal may determine whether to reply the feedback information to the second terminal according to the first indication information. Optionally, the first indication information may be configured by the second terminal or configured by the network device or be pre-configured. If the first indication information indicates that the first terminal needs to send the feedback information, when the first terminal receives the first sidelink channel sent by the second terminal, the first terminal sends the feedback information for the first sidelink channel to the second terminal; alternatively, if the first indication information indicates that the first terminal does not need to send the feedback information, when the first terminal receives the first sidelink channel sent by the second terminal, the first terminal does not send the feedback information for the first sidelink channel to the second terminal.

Optionally, in the first embodiment, if the first sidelink channel is sent in the multicast manner, the second terminal may send the first sidelink channel multiple times, which is beneficial to ensure the reliability of the data transmission. In this case, the first indication information may indicate that the feedback information does not need to be sent, and the group members in the group do not need to reply the feedback information to the second terminal, thereby reducing the feedback overhead. Alternatively, if the second terminal only sends the first sidelink channel once, the first indication information may indicate that the feedback information needs to be sent, and the group members in the group reply the feedback information to the second terminal, which is beneficial to ensure reliability of data transmission.

In a second embodiment, the third terminal, the second terminal, and the first terminal belong to the same group, the third terminal is the group header of the group, the first terminal and the second terminal are the group members of the group, which corresponds to the aforementioned second case.

In this second embodiment, the first terminal may receive the first sidelink channel sent by the second terminal, and the first sidelink channel may be sent by the second terminal to the first terminal in the unicast manner.

In this second embodiment, the first terminal may determine whether to send the feedback information to the second terminal according to the first indication information. Optionally, the first indication information may be configured by the third terminal or configured by the network device or be pre-configured. If the first indication information indicates that the first terminal needs to send the feedback information, when the first terminal receives the first sidelink channel sent by the second terminal, the first terminal sends the feedback information for the first sidelink channel to the second terminal; alternatively, if the first indication information indicates that the first terminal does not need to send the feedback information, when the first terminal receives the first sidelink channel sent by the second terminal, the first terminal does not send the feedback information for the first sidelink channel to the second terminal.

Therefore, according to the method for transmitting feedback information in the embodiments of the present disclosure, when the first terminal receives the first sidelink channel sent by the second terminal, it can determine whether it needs to send the feedback information to the second terminal according to the first indication information. The first terminal may not send the feedback information when transmission reliability of the first sidelink channel can be guaranteed, so that the feedback overhead of the terminal device can be reduced.

The method for transmitting feedback information according to an embodiment of the present disclosure is described in detail above with reference to FIG. 2 from a perspective of the first terminal, and a method for transmitting feedback information according to another embodiment of the present disclosure is described in detail below with reference to FIG. 3 from the perspective of the second terminal. It should be understood that the description on the second terminal side corresponds to the description on the first terminal side, and similar descriptions can be referred to above. To avoid repetition, details thereof are not repeated here.

FIG. 3 is a schematic flowchart of a method 300 for transmitting feedback information according to another embodiment of the present disclosure. The method 300 may be executed by a terminal device in an Internet of Vehicles system. As shown in FIG. 3, the method 300 includes S310, sending, by a second terminal, first indication information to a first terminal, wherein the first indication information is used for indicating whether the first terminal needs to send feedback information; and S320, sending, by the second terminal, a first sidelink channel to the first terminal.

Optionally, in some embodiments, the method further includes determining, by the second terminal, whether to receive the feedback information for the first sidelink channel sent by the first terminal according to the first indication information.

Optionally, in some embodiments, determining, by the second terminal, whether to receive the feedback information for the first sidelink channel sent by the first terminal according to the first indication information includes determining, by the second terminal, to receive the feedback information for the first sidelink channel sent by the first terminal if the first indication information indicates that the feedback information needs to be sent; or determining, by the second terminal, not to receive the feedback information for the first sidelink channel sent by the first terminal if the first indication information indicates that the feedback information does not need to be sent.

Optionally, in some embodiments, the first indication information further includes first identification information, and the first identification information is group identification information, or the first identification information is identification information of the second terminal, or the first identification information is used for indicating link information for unicast communication performed by the first terminal and the second terminal, wherein the group identification information is used for indicating a group where the first terminal and the second terminal are located.

Optionally, in some embodiments, whether the feedback information needs to be sent indicated by the first indication information is applicable to a group indicated by the first identification information, or the first sidelink channel sent by the second terminal, or a unicast link for unicast communication performed by the first terminal and the second terminal.

Optionally, in some embodiments, sending, by the second terminal, the first indication information to the first terminal includes sending, by the second terminal, a second sidelink channel to the first terminal, wherein the second sidelink channel includes the first indication information.

Optionally, in some embodiments, the second sidelink channel is a physical sidelink control channel (PSCCH), a physical sidelink shared channel (PSSCH) or a physical sidelink broadcast channel (PSBCH).

Optionally, in some embodiments, the first terminal and the second terminal belong to a first group, and the second terminal is a group header of the first group.

The method embodiments of the present disclosure are described in detail above with reference to FIGS. 2 to 3, and device embodiments of the present disclosure are described in detail below in conjunction with FIGS. 4 to 7. It should be understood that the device embodiments and the method embodiments correspond to each other and similar description can refer to the method embodiments.

Figure 4:
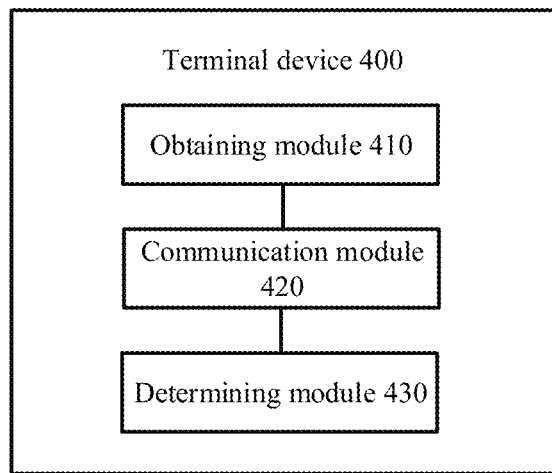
FIG. 4 is a schematic block diagram of a terminal device provided by an embodiment of the present disclosure.

FIG. 4 is a schematic structural diagram of a terminal device according to an embodiment of the present disclosure. As shown in FIG. 4, the terminal device 400 includes:

an obtaining module 410, configured to obtain first indication information, wherein the first indication information is used for indicating whether the first terminal needs to send feedback information; a communication module 420, configured to receive a first sidelink channel sent by a second terminal; and a determining module 430, configured to determine whether to send feedback information for the first sidelink channel to the second terminal according to the first indication information.

Optionally, in some embodiments, the determining module 430 is specifically configured to determine to send the feedback information for the first sidelink channel to the second terminal if the first indication information indicates that the feedback information needs to be sent; or determine not to send the feedback information for the first sidelink channel to the second terminal if the first indication information indicates that the feedback information does not need to be sent.

Optionally, in some embodiments, the first indication information further includes first identification information, and the first identification information is group identification information, or the first identification information is identification information of the second terminal, or the first identification information is used for indicating link information for unicast communication performed by the terminal device and the second terminal, wherein the group identification information is used for indicating a group where the terminal device and the second terminal are located.

Optionally, in some embodiments, whether the feedback information needs to be sent indicated by the first indication information is applicable to communication within a group indicated by the first identification information, or the first sidelink channel sent by the second terminal, or a unicast link for unicast communication performed by the terminal device and the second terminal.

Optionally, in some embodiments, the communication module is further configured to receive a second sidelink channel, and the second sidelink channel includes the first indication information.

Optionally, in some embodiments, the second sidelink channel is a physical sidelink control channel (PSCCH), a physical sidelink shared channel (PSSCH) or a physical sidelink broadcast channel (PSBCH).

Optionally, in some embodiments, the communication module is specifically configured to receive the second sidelink channel sent by the second terminal.

Optionally, in some embodiments, the communication module is specifically configured to receive the second sidelink channel sent by a third terminal.

Optionally, in some embodiments, the terminal device, the second terminal, and the third terminal belong to a first group, and the third terminal is a group header of the first group.

Optionally, in some embodiments, the communication module is further configured to receive first configuration information sent by a network device, and the first configuration information includes the first indication information.

Optionally, in some embodiments, the first configuration information is sent by the network device through broadcast information, radio resource control (RRC) signaling, or downlink control information (DCI).

Optionally, in some embodiments, the first indication information is pre-configured on the terminal device.

Figure 5:
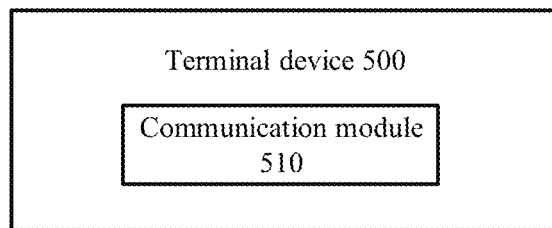
FIG. 5 is a schematic block diagram of a terminal device provided by an embodiment of the present disclosure.

FIG. 5 is a schematic structural diagram of a terminal device according to another embodiment of the present disclosure. As shown in FIG. 5, the terminal device 500 includes: a communication module 510, configured to send first indication information to a first terminal, wherein the first indication information is used for indicating whether the first terminal needs to send feedback information; and send a first sidelink channel to the first terminal.

Optionally, in some embodiments, the communication module 510 is further configured to determine whether to receive feedback information for the first sidelink channel sent by the first terminal according to the first indication information.

Optionally, in some embodiments, the communication module 510 is specifically configured to determine to receive the feedback information for the first sidelink channel sent by the first terminal if the first indication information indicates that the feedback information needs to be sent; or determine not to receive the feedback information for the first sidelink channel sent by the first terminal if the first indication information indicates that the feedback information does not need to be sent.

Optionally, in some embodiments, the first indication information further includes first identification information, and the first identification information is group identification information, or the first identification information is identification information of the terminal device, or the first identification information is used for indicating link information for unicast communication performed by the first terminal and the terminal device, wherein the group identification information is used for indicating a group where the first terminal and the terminal device are located.

Optionally, in some embodiments, whether the feedback information needs to be sent indicated by the first indication information is applicable to a group indicated by the first identification information, or the first sidelink channel sent by the terminal device, or a unicast link for unicast communication performed by the first terminal and the terminal device.

Optionally, in some embodiments, the communication module 510 is specifically configured to send a second sidelink channel to the first terminal, wherein the second sidelink channel includes the first indication information.

Optionally, in some embodiments, the second sidelink channel is a physical sidelink control channel (PSCCH), a physical sidelink shared channel (PSSCH) or a physical sidelink broadcast channel (PSBCH).

Optionally, in some embodiments, the first terminal and the terminal device belong to a first group, and the terminal device is a group header of the first group.

Figure 6:
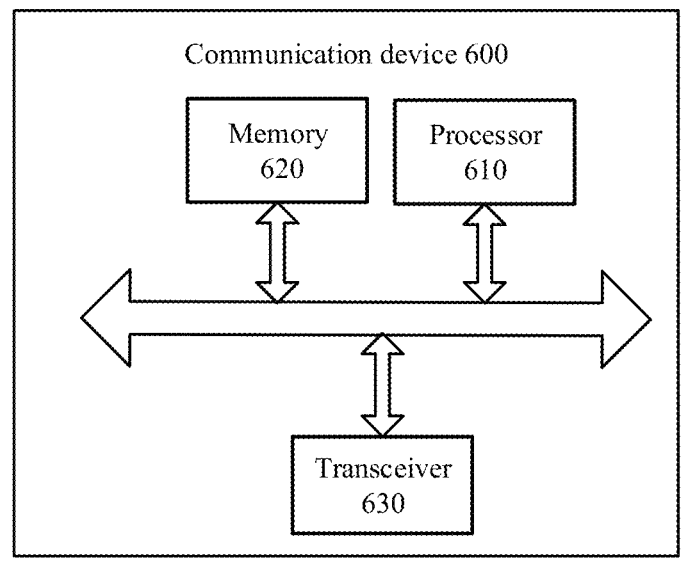
FIG. 6 is a schematic block diagram of a terminal device provided by another embodiment of the present disclosure.

FIG. 6 is a schematic structural diagram of a communication device 600 according to an embodiment of the present disclosure. The communication device 600 shown in FIG. 6 includes a processor 610, and the processor 610 may invoke a computer program from a memory and run the computer program, to implement the method in the embodiments of the present disclosure.

Optionally, as shown in FIG. 6, the communication device 600 may further include a memory 620. The processor 610 may invoke the computer program from the memory 620 and run the computer program, to implement the method in the embodiments of the present disclosure.

The memory 620 may be a component independent of the processor 610 or may be integrated into the processor 610.

Optionally, as shown in FIG. 6, the communication device 600 may further include a transceiver 630, and the processor 610 may control the transceiver 630 to communicate with another device, and specifically, the transceiver 630 may transmit information or data to another device, or receive information or data transmitted by another device.

The transceiver 630 may include a transmitter and a receiver. The transceiver 630 may further include an antenna. There may be one or more antennas.

Optionally, the communication device 600 may specifically be the mobile terminal/terminal device in the embodiments of the present disclosure, and the communication device 600 can implement corresponding procedures implemented by the mobile terminal/terminal device in various methods in the embodiments of the present disclosure. For brevity, details thereof are not described herein again.

Figure 7:
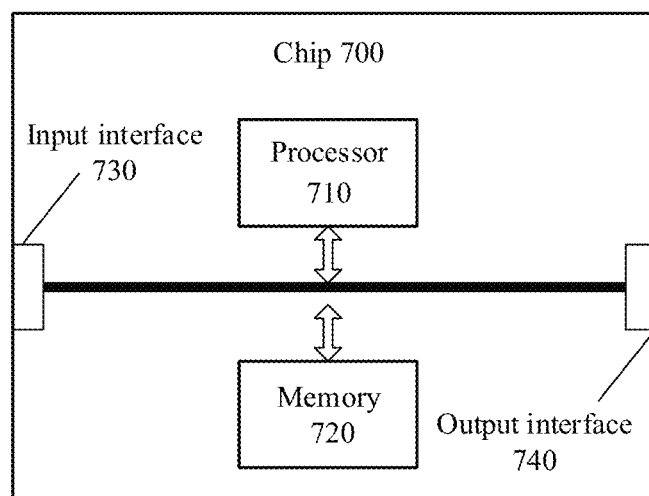
FIG. 7 is a schematic block diagram of a chip provided by an embodiment of the present disclosure.

FIG. 7 is a schematic structural diagram of a chip according to an embodiment of the present disclosure. The chip 700 shown in FIG. 7 includes a processor 710, and the processor 710 may invoke a computer program from a memory and run the computer program, to implement the method in the embodiments of the present disclosure.

Optionally, as shown in FIG. 7, the chip 700 may further include a memory 720. The processor 710 may invoke the computer program from the memory 720 and run the computer program, to implement the method in the embodiments of the present disclosure.

The memory 720 may be a component independent of the processor 710 or may be integrated into the processor 710.

Optionally, the chip 700 may further include an input interface 730. The processor 710 may control the input interface 730 to communicate with another device or chip, and specifically, the input interface 730 may obtain information or data transmitted by another device or chip.

Optionally, the chip 700 may further include an output interface 740. The processor 710 may control the output interface 740 to communicate with another device or chip, and specifically, the output interface 740 may output information or data to another device or chip.

Optionally, the chip may be applied to the mobile terminal/terminal device in the embodiments of the present disclosure, and the chip can implement corresponding procedures implemented by the mobile terminal/terminal device in various methods in the embodiments of the present disclosure. For brevity, details thereof are not described herein again.

It should be noted that, the chip mentioned in the embodiments of the present disclosure may also be referred to as a system-level chip, a system chip, a chip system, a system on chip, or the like.

It should be understood that the processor of the embodiments of the present disclosure may be an integrated circuit chip and has a signal processing capability. and the steps of the foregoing method embodiment may be implemented by using a hardware integrated logic circuit in the processor and/or implemented by using an instruction in a software form. The foregoing processor may be a general purpose processor, a digital signal processor (DSP), an application specific integrated circuit (ASIC), a field programmable gate array (FPGA) or another programmable logic device, a discrete gate or a transistor logic device, or a discrete hardware component. The respective methods, steps and logic blocks disclosed in the embodiments of the present disclosure may be implemented or executed. The general purpose processor may be a microprocessor, or may be any conventional processor, or the like. Steps of the methods disclosed with reference to the embodiments of the present disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It should be understood that, the memory in the embodiments of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. By way of examples but of no limitation, many forms of RAM are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synclink dynamic random access memory (SLDRAM), and a direct rambus random access memory (DRRAM). It should be noted that, the memory of the system and the method described herein is intended to include but is not limited to these memories and any other suitable type of memory.

It should be understood that the above memory is an example but is not intended for limitation. For example, the memory in the embodiments of the present disclosure may alternatively be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and the like. That is, the memory described in the embodiments of the present disclosure is intended to include but is not limited to these memories and any other suitable type of memory.

An embodiment of the present disclosure further provides a computer readable storage medium. The computer readable storage medium is configured to store a computer program.

Optionally, the computer readable storage medium may be applied to the network device in the embodiments of the present disclosure, and the computer program enables a computer to execute a corresponding procedure implemented by the network device in the methods of the embodiments of the present disclosure. For brevity, details thereof are not described herein again.

Optionally, the computer readable storage medium may be applied to the mobile terminal/terminal device in the embodiments of the present disclosure, and the computer program enables the computer to execute a corresponding procedure implemented by the mobile terminal/terminal device in the methods of the embodiments of the present disclosure. For brevity, details thereof are not described herein again.

The present disclosure further provides a computer program product. The computer program product includes a computer program instruction.

Optionally, the computer program product may be applied to the network device in the embodiments of the present disclosure, and the computer program instruction enables the computer to execute a corresponding procedure implemented by the network device in the methods of the embodiments of the present disclosure. For brevity, details thereof are not described herein again.

Optionally, the computer program product may be applied to the mobile terminal/terminal device in the embodiments of the present disclosure, and the computer program instruction enables the computer to execute a corresponding procedure implemented by the mobile terminal/terminal device in the methods of the embodiments of the present disclosure. For brevity, details thereof are not described herein again.

The present disclosure further provides a computer program.

Optionally, the computer program may be applied to the network device in the embodiments of the present disclosure, and when running on a computer, the computer program instruction enables the computer to execute a corresponding procedure implemented by the network device in the methods of the embodiments of the present disclosure. For brevity, details thereof are not described herein again.

Optionally, the computer program may be applied to the mobile terminal/terminal device in the embodiments of the present disclosure, and when running on a computer, the computer program instruction enables the computer to execute a corresponding procedure implemented by the mobile terminal/terminal device in the methods of the embodiments of the present disclosure. For brevity, details thereof are not described herein again.

A person of ordinary skill in the art may be aware that units and algorithm steps in the examples described in combination with the embodiments disclosed herein may be implemented by using electronic hardware or a combination of computer software and electronic hardware. Whether these functions are executed by means of hardware or software depends on specific applications and design constraints of the technical solutions. A person skilled in the art may use different methods to implement the described functions for each particular application, but it should not be considered that the implementation goes beyond the scope of the present disclosure.

A person skilled in the art may clearly understand that, for simple and clear description, for specific work processes of the foregoing described system, apparatus, and unit, reference may be made to corresponding process in the foregoing method embodiments, and details thereof are not described herein again.

In several embodiments provided by the present disclosure, it should be understood that the disclosed system, apparatus, and method may be implemented in other manners. For example, the apparatus embodiments described above are merely examples. For example, the unit division is merely logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Described above are merely specific implementations of the present disclosure, but the protection scope of the present disclosure is not limited thereto. Changes or replacements readily figured out by any person skilled in the art within the technical scope disclosed in the present disclosure shall be covered by the protection scope of the present disclosure. Therefore, the protection scope of the present disclosure shall be subject to the protection scope of the claims.

What is claimed is:

1. A method for transmitting feedback information, comprising:
    obtaining, by a first terminal, first indication information, wherein the first indication information is used for indicating whether the first terminal needs to send feedback information;
    receiving, by the first terminal, a physical sidelink shared channel (PSSCH) sent by a second terminal; and
    determining, by the first terminal, whether to send the feedback information for the PSSCH to the second terminal according to the first indication information,
    wherein the first indication information comprises a field, and
    determining, by the first terminal, whether to send the feedback information to the second terminal according to the first indication information comprises:
    determining, by the first terminal, to send the feedback information to the second terminal if the field is in a first state; or
    determining, by the first terminal, not to send the feedback information to the second terminal if the field is in a second state.

2. The method according to claim 1, wherein the field is one bit, and
    determining, by the first terminal, whether to send the feedback information to the second terminal according to the first indication information comprises:
    determining, by the first terminal, to send the feedback information to the second terminal when the one bit is 1, and
    determining, by the first terminal, not to send the feedback information to the second terminal when the one bit is 0.

3. The method according to claim 1, wherein the first indication information further comprises first identification information, and the first identification information is group identification information, or the first identification information is identification information of the second terminal, or the first identification information is used for indicating link information for unicast communication performed by the first terminal and the second terminal, wherein the group identification information is used for indicating a group which comprises the first terminal and the second terminal.

4. The method according to claim 3, wherein whether the feedback information needs to be sent indicated by the first indication information is applicable to a group indicated by the first identification information, or the PSSCH sent by the second terminal, or a unicast link for the unicast communication performed by the first terminal and the second terminal.

5. The method according to claim 1, wherein the PSSCH comprises the first indication information.

6. The method according to claim 1, wherein the first indication information is pre-configured on the first terminal.

7. A method for transmitting feedback information, comprising:
    sending, by a second terminal, first indication information to a first terminal, wherein the first indication information is used for indicating whether the first terminal needs to send feedback information; and
    sending, by the second terminal, a physical sidelink shared channel (PSSCH) to the first terminal,
    wherein the first indication information comprises a field, and
    wherein the method further comprises:
    determining, by the second terminal, to receive the feedback information for the PSSCH sent by the first terminal if the field is in a first state; or
    determining, by the second terminal, not to receive the feedback information for the PSSCH sent by the first terminal if the field is in a second state.

8. The method according to claim 7, wherein the field is one bit, and
    wherein the method further comprises:
    determining, by the second terminal, to receive the feedback information sent by the first terminal when the one bit is 1, and
    determining, by the second terminal, not to receive the feedback information sent by the first terminal when the one bit is 0.

9. The method according to claim 7, wherein the first indication information further comprises first identification information, and the first identification information is group identification information, or the first identification information is identification information of the second terminal, or the first identification information is used for indicating link information for unicast communication performed by the first terminal and the second terminal, wherein the group identification information is used for indicating a group which comprises the first terminal and the second terminal.

10. The method according to claim 9, wherein whether the feedback information needs to be sent indicated by the first indication information is applicable to a group indicated by the first identification information, or the PSSCH sent by the second terminal, or a unicast link for the unicast communication performed by the first terminal and the second terminal.

11. The method according to claim 7, wherein the PSSCH comprises the first indication information.

12. The method according to claim 7, wherein sending, by the second terminal, the first indication information to the first terminal comprises:
sending, by the second terminal, a second sidelink channel to the first terminal, wherein the second sidelink channel comprises the first indication information.

13. A terminal device which is a second terminal device, comprising: a processor and a memory, wherein the memory is configured to store a computer program, and the processor is configured to call and run the computer program stored in the memory to execute a method for transmitting feedback information comprising:
sending, by a second terminal, first indication information to a first terminal, wherein the first indication information is used for indicating whether the first terminal needs to send feedback information; and
sending, by the second terminal, a physical sidelink shared channel (PSSCH) to the first terminal,
wherein the first indication information comprises a field, and
wherein the method further comprises:
determining, by the second terminal, to receive the feedback information for the PSSCH sent by the first terminal if the field is in a first state; or
determining, by the second terminal, not to receive the feedback information for the PSSCH sent by the first terminal if the field is in a second state.

14. The terminal device according to claim 13, wherein the field is one bit, and
wherein the method further comprises:
determining, by the second terminal, to receive the feedback information sent by the first terminal when the one bit is 1, and
determining, by the second terminal, not to receive the feedback information sent by the first terminal when the one bit is 0.

15. The terminal device according to claim 13, wherein the first indication information further comprises first identification information, and the first identification information is group identification information, or the first identification information is identification information of the second terminal, or the first identification information is used for indicating link information for unicast communication performed by the first terminal and the second terminal, wherein the group identification information is used for indicating a group which comprises the first terminal and the second terminal.

16. The terminal device according to claim 15, wherein whether the feedback information needs to be sent indicated by the first indication information is applicable to a group indicated by the first identification information, or the PSSCH sent by the second terminal, or a unicast link for the unicast communication performed by the first terminal and the second terminal.

17. The terminal device according to claim 13, wherein the PSSCH comprises the first indication information.

* * * * *